US009282599B2

(12) United States Patent
Pan et al.

(10) Patent No.: US 9,282,599 B2
(45) Date of Patent: Mar. 8, 2016

(54) LIGHT-EMITTING DIODE LAMP COMPATIBLE WITH AN ELECTRONIC BALLAST GENERATING PREHEATING CURRENT

(71) Applicant: LUXUL TECHNOLOGY INCORPORATION, New Taipei (TW)

(72) Inventors: Cheng-Hung Pan, New Taipei (TW); Perng-Fei Yuh, New Taipei (TW)

(73) Assignee: LUXUL TECHNOLOGY INCORPORATION, New Taipei (TW)

( * ) Notice: Subject to any disclaimer, the term of this patent is extended or adjusted under 35 U.S.C. 154(b) by 140 days.

(21) Appl. No.: 14/084,904

(22) Filed: Nov. 20, 2013

(65) Prior Publication Data

US 2014/0239814 A1  Aug. 28, 2014

(30) Foreign Application Priority Data

Feb. 22, 2013 (TW) .............................. 102106160 A

(51) Int. Cl.
*H05B 33/08* (2006.01)

(52) U.S. Cl.
CPC ........ *H05B 33/0809* (2013.01); *H05B 33/0815* (2013.01); *Y02B 20/347* (2013.01)

(58) Field of Classification Search
None
See application file for complete search history.

(56) References Cited

U.S. PATENT DOCUMENTS

| 6,853,151 | B2 * | 2/2005 | Leong | H05B 33/0809 315/185 R |
| 8,294,384 | B2 * | 10/2012 | Matsuda | H05B 41/295 315/209 R |
| 8,358,056 | B2 * | 1/2013 | Park | 313/498 |
| 8,593,076 | B2 * | 11/2013 | Veskovic | H05B 41/295 315/200 R |
| 8,622,571 | B2 * | 1/2014 | Hartikka | H05B 33/0803 362/221 |
| 8,907,557 | B2 * | 12/2014 | Park | H05B 33/0803 313/498 |
| 2010/0284204 | A1 * | 11/2010 | Mayell | H02M 3/335 363/37 |
| 2014/0021871 | A1 * | 1/2014 | Loef | H05B 33/0809 315/186 |
| 2014/0159592 | A1 * | 6/2014 | Pan | F21K 9/17 315/187 |

* cited by examiner

*Primary Examiner* — Alexander H Taningco
*Assistant Examiner* — Nelson Correa
(74) *Attorney, Agent, or Firm* — Rabin & Berdo, P.C.

(57) ABSTRACT

An LED lamp has two preheating current control units respectively connected to a first electrode terminal and a second electrode terminal of the LED lamp, two lamp-side rectification circuits, and an LED light string. Each preheating current control unit has a ballast-side rectification circuit connected to one of the first and second electrode terminals and a load-varying circuit having a resistive load and a control circuit. The resistive load is serially connected to a DC output terminal of the ballast-side rectification circuit through the control circuit. The control circuit adjusts a resistance of the resistive load. Two input terminals of each lamp-side rectification circuit are respectively connected to one of the electrodes of each of the first electrode terminal and the second electrode terminal. The LED light string has two ends respectively connected to the two output terminals of each lamp-side rectification circuit, and has multiple series-connected LED elements.

24 Claims, 3 Drawing Sheets

LIGHT-EMITTING DIODE LAMP COMPATIBLE WITH AN ELECTRONIC BALLAST GENERATING PREHEATING CURRENT

BACKGROUND OF THE INVENTION

1. Field of the Invention

The present invention relates to a light-emitting diode (LED) lamp, and more particularly to an LED lamp compatible with an electronic ballast generating preheating current.

2. Description of the Related Art

With reference to FIG. 2, a conventional fluorescent lamp 50 is a gas discharge lamp, which must preheat a lamp filament 52 of the fluorescent lamp 50 to ionize a gas inside the lamp.

The conventional fluorescent lamp 50 usually has a first electrode terminal L, a second electrode terminal N, a lamp tube 51, and two lamp filaments 52. The first electrode terminal L and the second electrode terminal N are respectively mounted on two ends of the fluorescent lamp 50, and are electrically connected to the AC power output terminal of an electronic ballast 60. The first electrode terminal L has two electrodes L1 and L2, and the second electrode terminal N has two electrodes N1 and N2. The two lamp filaments 52 are mounted inside the lamp tube 51, and each lamp filament 52 is mounted between the electrodes L1, L2 or between the electrodes N1, N2. When the conventional fluorescent lamp 50 is operated, if a rapid start electronic ballast or a program start electronic ballast is used, the electronic ballast will provide a preheating current to each of the first electrode terminal and the second electrode terminal. The preheating current flows through and heats the lamp filament 52 to ionize the gas inside the lamp for the fluorescent lamp 50 to emit light.

To be compatible with conventional lamp holders, most existing LED lamps follow the design of the conventional lamp tube 51. In other words, the first electrode terminal L and the second electrode terminal N on both ends of the lamp tube 51 remain unchanged. The first electrode terminal L and the second electrode terminal N are respectively connected to the LED components on both ends of a conventional LED lamp to serve as a power source. However, the conventional LED lamp has no lamp filament therein, meaning that there is no resistance (lamp filament) connected between the electrodes L1, L2 of the first electrode terminal L and between the electrodes N1, N2 of the second electrode terminal N. Hence, if the LED lamp is directly connected to a rapid start electronic ballast or a program start electronic ballast, the electronic ballast will provide a short-circuit current to the electrodes L1, L2 and the electrodes N1, N2 after the electronic ballast is powered on. Such short-circuit current can damage the electronic ballast 60 and the LED lamp and shorten the life durations of the electronic ballast 60 and the LED lamp.

SUMMARY OF THE INVENTION

An objective of the present invention is to provide an LED lamp compatible with an electronic ballast generating preheating current for preventing short-circuit current from damaging the LED lamp and a ballast connected therewith.

To achieve the foregoing objective, the LED lamp compatible with an electronic ballast generating preheating current has a first electrode terminal, a second electrode terminal, two preheating current control units, two lamp-side rectification circuits, and at least one LED light string.

The first electrode terminal and the second electrode terminal are located on both ends of the LED lamp. Each of the first electrode terminal and the second electrode terminal has two electrodes.

The two preheating current control units are respectively connected to the first electrode terminal and the second electrode terminal. Each preheating current control unit has a ballast-side rectification circuit and a load-varying circuit.

The ballast-side rectification circuit has two AC input terminals, two DC output terminals, and multiple rectification diodes.

The two AC input terminals are respectively connected to the electrodes of the first electrode terminal or the second electrode terminal.

Each rectification diode has a recovery time less than 2.5 microsecond.

The load-varying circuit has a resistive load and a control circuit.

The control circuit is connected in series with the resistive load between the DC output terminals of the ballast-side rectification circuit, and adjusts a resistance of the resistive load.

Each lamp-side rectification circuit has multiple rectification diodes, two input terminals, and two output terminals.

Each rectification diode has a recovery time less than 2.5 microsecond.

The two input terminals of each lamp-side rectification circuit are respectively connected to one of the electrodes of the first electrode terminal and one of the electrodes of the second electrode terminal.

Each one of the at least one LED light string has two ends respectively connected to the two output terminals of each lamp-side rectification circuit, and is formed by multiple series-connected LED elements.

When the LED lamp of the present invention is connected with a conventional lamp holder and is powered on, the electronic ballast treats the preheating current control units as a lamp filament for the sake of the design of the preheating current control units. Thus, the preheating current control units can simulate the lamp filament for the preheating current of the electronic ballast to flow through the preheating current control units connected to the electrode terminals of the LED lamp. The preheating current is limited by the preheating current control units and a short-circuit condition will not occur between the electrodes of each of the electrode terminals, so as to avoid damage to the electronic ballast and the LED lamp arising from an over-current condition.

Other objectives, advantages and novel features of the invention will become more apparent from the following detailed description when taken in conjunction with the accompanying drawings.

DETAILED DESCRIPTION OF THE INVENTION

Figure 1A:
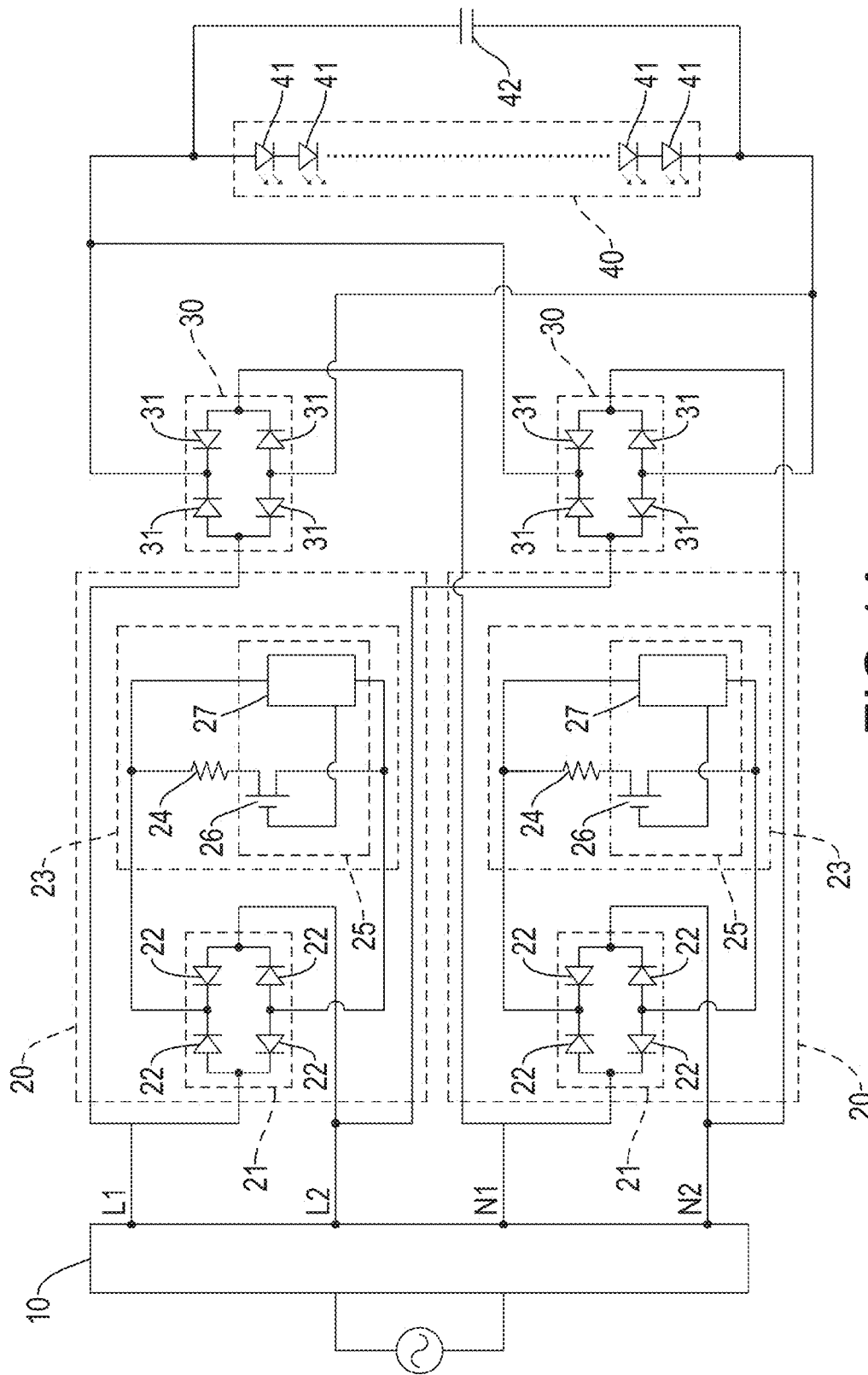
FIG. 1A is a circuit diagram of an embodiment of an LED lamp compatible with an electronic ballast generating preheating current in accordance with the present invention.

With reference to FIG. 1A, an embodiment of an LED lamp compatible with an electronic ballast generating preheating current in accordance with the present invention has an light-emitting diode (LED) lamp, and an electronic ballast 10.

The LED lamp has a first electrode terminal L and a second electrode terminal N on both ends of the LED lamp. The first electrode terminal L has two electrodes L1, L2. The second electrode terminal N has two electrodes N1, N2.

The electronic ballast 10 has an input terminal and four AC output terminals. The input terminal is connected to an AC power source (60 Hz). The four AC output terminals are respectively connected to the electrodes L1, L2 of the first electrode terminal L and the electrodes N1, N2 of the second electrode terminal N of the LED lamp.

The LED lamp further has two preheating current control units 20, two lamp-side rectification circuits 30, and an LED light string 40.

The two preheating current control units 20 are respectively connected to the first electrode terminal L and the second electrode terminal N. Each preheating current control unit 20 has a ballast-side rectification circuit 21 and a load-varying circuit 23.

The ballast-side rectification circuit 21 has a full-bridge circuit formed by multiple rectification diodes 22. Each rectification diode 22 has a recovery time less than 2.5 microsecond (μs) based on that the electronic ballast 10 has a frequency at 40 kHz. To avoid overheating, the cycle of the recovery time is shortened to a value taken as one tenth of the cycle, which is preferably below 1 μs or equal to 0.2 μs. Each ballast-side rectification circuit 21 has two AC input terminals respectively connected to the electrodes L1, L2/N1, N2 of the first electrode terminal L or the second electrode terminal N.

The load-varying circuit 23 has a resistor 24 and a control circuit 25. The control circuit 25 has a voltage-controlled transistor 26 and a controller 27. The voltage-controlled transistor 26 and the resistor 24 are connected in series between two DC output terminals of the ballast-side rectification circuit 21. The controller 27 is connected to a control terminal of the voltage-controlled transistor 26 to output different driving voltages to the control terminal. The controller 27 is built in with a resistance-switching mode to adjust a resistance of a load connected to the AC output terminals of the electronic ballast 10. As the electronic ballast 10 outputs AC power from the AC output terminals upon getting started, the two electrodes of each one of the first electrode terminal L and the second electrode terminal N generate a voltage difference so that the electrodes of each one of the first electrode terminal L and the second electrode terminal N generate a preheating current. Meanwhile, the ballast-side rectification circuit 21 of each preheating current control unit 20 simultaneously outputs a DC power. After detecting the DC power, the controller 27 performs the resistance-switching mode. When outputting the DC power, the ballast-side rectification circuit 21 outputs a driving voltage to turn on a corresponding voltage-controlled transistor 26 for a preheating current to be generated between the electrodes of a corresponding one of the first electrode terminal L and the second electrode terminal N through a corresponding resistor 24 and the corresponding voltage-controlled transistor 26. When the ballast-side rectification circuit 21 stops outputting the DC power, the controller 27 lowers the driving voltage outputted to the voltage-controlled transistor 26 to increase a resistance connected between the two electrodes of a corresponding one of the first electrode terminal L and the second electrode terminal N. The controller 27 further presets a switching time and starts counting time when driving the voltage-controlled transistor 26 to turn on. When the switching time expires, the controller 27 lowers the driving voltage for the LED lamp to be compatible with an existing preheated activation electronic ballast having a switching time. In other words, the controller 27 starts counting a preheating time when the electronic ballast 10 is activated and stops outputting AC power to the electrodes of each one of the first electrode terminal L and the second electrode terminal N when the preheating time expires. Hence, the controller 27 can set the switching time as the preheating time of the electronic ballast 10 and lower the driving voltage when the electronic ballast 10 stops outputting AC power to the electrodes of each one of the first electrode terminal L and the second electrode terminal N for a high-resistance load to be connected in series between the electrodes of each one of the first electrode terminal L and the second electrode terminal N.

The lamp-side rectification circuit 30 has a full-bridge circuit formed by multiple rectification diodes 31. Each rectification diode 31 has a recovery time less than 2.5 μs. The lamp-side rectification circuit 30 has two input terminals respectively connected to one of the electrodes of the first electrode terminal L and one of the electrodes of the second electrode terminal N.

The LED light string 40 has two ends respectively connected to two output terminals of each lamp-side rectification circuit 30, and is formed by multiple series-connected LED elements 41. A capacitor 42 is parallelly connected to the two ends of the LED light string 40, and is charged when the AC power outputted from the output terminals of the lamp-side rectification circuits 30 rises from a low voltage to a peak voltage. When the AC power drops from the peak voltage to a low voltage, the capacitor 42 discharges power stored therein to the LED light string 40 to resolve the flash rate issue when the LED light string 40 is lit. Generally, the flash rate issue resides in a high frequency (20 kHz-40 kHz) and can be completely eliminated after the capacitor 42 is added. Preferably, the capacitor 42 has a capacitance value in a range of 1 μF to 20 μF. As the electronic ballast 10 has a high frequency, the capacitor 42 does not need a very high capacitance value.

Figure 1B:
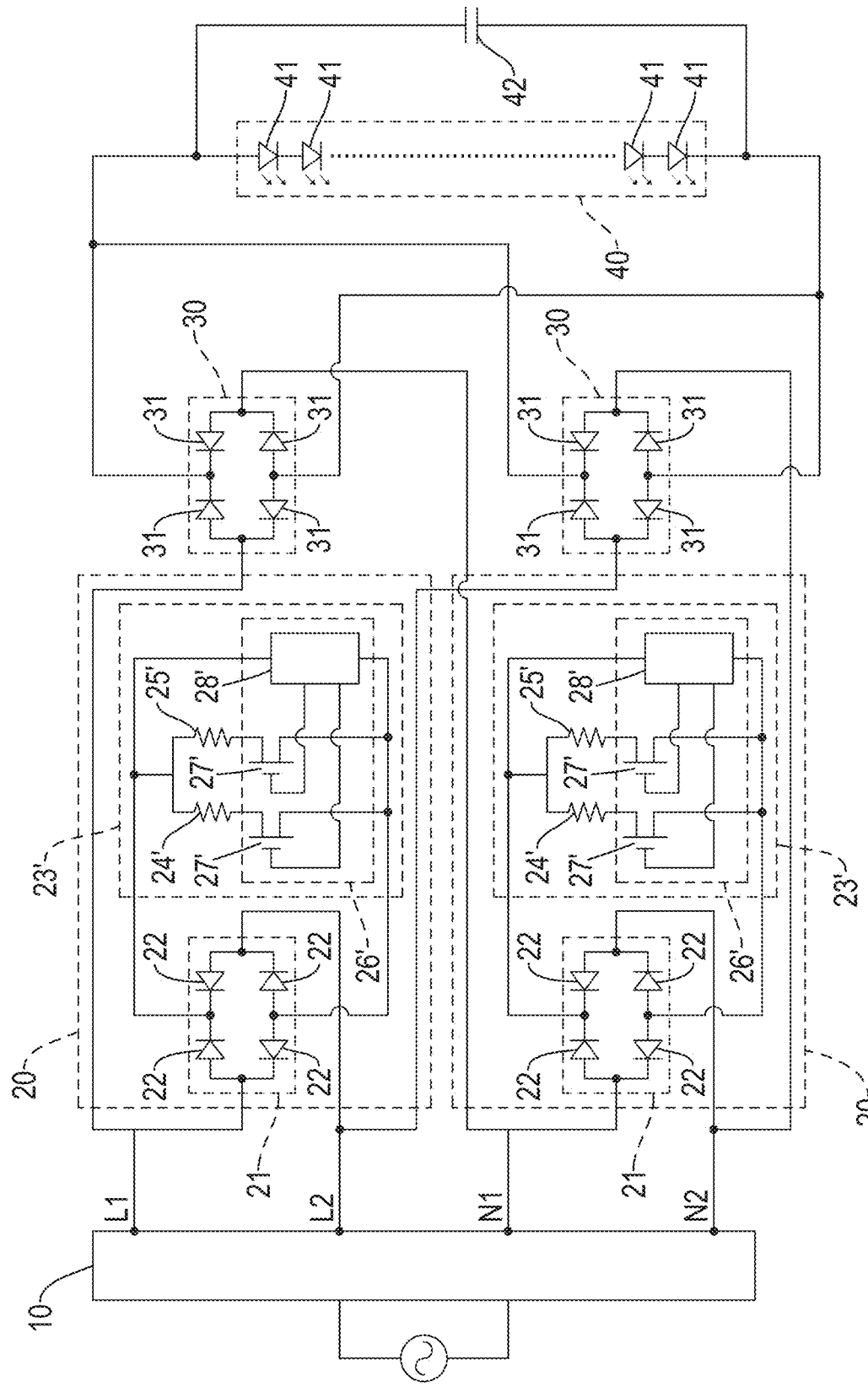
FIG. 1B is a circuit diagram of another embodiment of an LED lamp compatible with an electronic ballast generating preheating current in accordance with the present invention.
Figure 2:
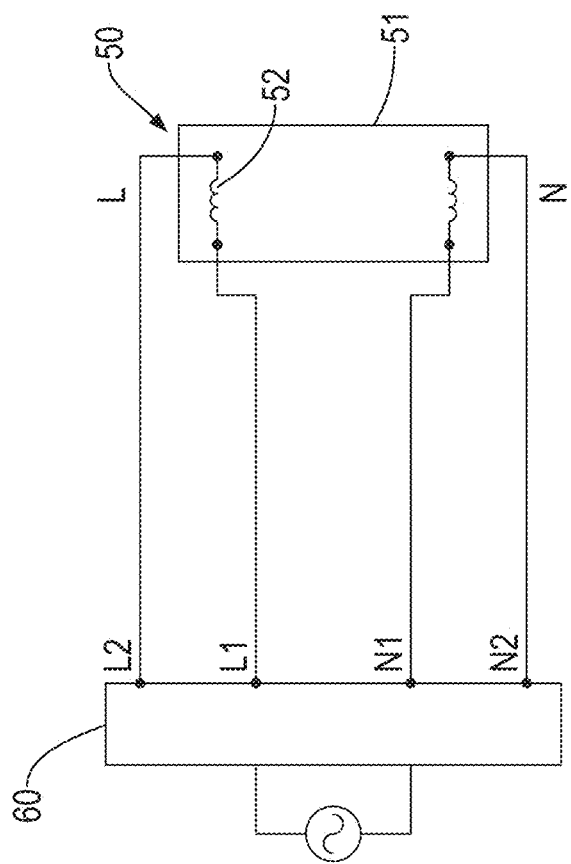
FIG. 2 is a circuit diagram of a conventional fluorescent lamp.

With reference to FIG. 1B, a second embodiment of an LED lamp in accordance with the present invention has two preheating current control units 20, two lamp-side rectification circuits 30, and an LED light string 40.

The two preheating current control units 20 are respectively connected to the first electrode terminal L and the second electrode terminal N. Each preheating current control unit 20 has a ballast-side rectification circuit 21 and a load-varying circuit 23'.

The ballast-side rectification circuit 21 has a full-bridge circuit formed by multiple rectification diodes 22. Each rectification diode 22 has a recovery time less than 2.5 μs based on that the electronic ballast 10 has a frequency at 40 kHz. To avoid overheating, the cycle of the recovery time is shortened to a value taken as one tenth of the cycle, which is preferably below 1 μs or equal to 0.2 μs. Each ballast-side rectification circuit 21 has two AC input terminals respectively connected to the electrodes L1, L2/N1, N2 of the first electrode terminal L or the second electrode terminal N.

The load-varying circuit 23' has a first resistor 24', a second resistor 25', and a control circuit 26'. The first resistor 24' has a smaller resistance value than that of the second resistor 25'. The control circuit 26' has two voltage-controlled transistors 27' and a controller 28'. One of the voltage-controlled transistors 27' is connected in series with the first resistor 24', and the other voltage-controlled transistor 27' is connected in series with the second resistor 25'. The voltage-controlled transistor 27' and the first resistor 24' that are series-connected and the other voltage-controlled transistor 27' and the second resistor 25' that are series-connected are parallelly connected between two DC output terminals of the ballast-side rectification circuit 21. The controller 28' has two output terminals respectively connected to two control terminals of the two voltage-controlled transistors 27' to output different driving voltages to the control terminals. The controller 28' is built in with a resistance-switching mode to adjust a resistance of a load connected to the AC output terminals of the electronic ballast 10. As the electronic ballast 10 outputs AC power from the AC output terminals upon getting started, the two electrodes of each one of the first electrode terminal L and the second electrode terminal N generate a voltage difference so that the electrodes of each one of the first electrode terminal L and the second electrode terminal N generate a preheating current. Meanwhile, the ballast-side rectification circuit 21 of each preheating current control unit 20 simultaneously outputs a DC power. After detecting the DC power, the controller 28' performs the resistance-switching mode. When outputting the DC power, the ballast-side rectification circuit 21 outputs a driving voltage to turn on the voltage-controlled transistor 26 connected in series with the first resistor 24' for a preheating current to be generated between the electrodes of a corresponding one of the first electrode terminal L and the second electrode terminal N through the first resistor 24' and the series-connected voltage-controlled transistor 27'. When the ballast-side rectification circuit 21 stops outputting the DC power, the controller 28' stops outputting the driving voltage to the voltage-controlled transistor 27' series-connected with the first resistor 24' but outputs the driving voltage to the voltage-controlled transistor 27' series-connected with the second resistor 25' with a higher resistance value to increase a resistance connected between the two electrodes of a corresponding one of the first electrode terminal L and the second electrode terminal N. The controller 28' further presets a switching time and starts counting time when driving the voltage-controlled transistor 27' series-connected with the first resistor 24' to turn on. When the switching time expires, the controller 28' stops outputting the driving voltage to the voltage-controlled transistor 27' series-connected with the first resistor 24' while outputting the driving voltage to the voltage-controlled transistor 27' series-connected with the second resistor 25' for the LED lamp to be compatible with an existing preheated activation electronic ballast having a switching time. In other words, the controller 28' starts counting a preheating time when the electronic ballast 10 is activated and stops outputting AC power to the electrodes of each one of the first electrode terminal L and the second electrode terminal N when the preheating time expires. Hence, the controller 28' can set the switching time as the preheating time of the electronic ballast 10 and stop outputting the driving voltage to the voltage-controlled transistor 27' series-connected with the first resistor 24' but outputs the driving voltage to turn on the voltage-controlled transistor 27' series-connected with the second resistor 25' when the electronic ballast 10 stops outputting AC power to the electrodes of each one of the first electrode terminal L and the second electrode terminal N for a high-resistance load to be connected in series between the electrodes of each one of the first electrode terminal L and the second electrode terminal N.

Each lamp-side rectification circuit 30 has a full-bridge circuit formed by multiple rectification diodes 31. Each rectification diode 31 has a recovery time less than 2.5 μs. The lamp-side rectification circuit 30 has two input terminals respectively connected to one of the electrodes of the first electrode terminal L and one of the electrodes of the second electrode terminal N.

The LED light string 40 has two ends respectively connected to two output terminals of each lamp-side rectification circuit 30, and is formed by multiple series-connected LED elements 41. A capacitor 42 is parallelly connected to the two ends of the LED light string 40, and is charged when the AC power outputted from the output terminals of the lamp-side rectification circuits 30 rises from a low voltage to a peak voltage. When the AC power drops from the peak voltage to a low voltage, the capacitor 42 discharges power stored therein to the LED light string 40 to resolve the flash rate issue when the LED light string 40 is lit. Generally, the flash rate issue resides in a high frequency (20 kHz-40 kHz) and can be completely eliminated after the capacitor 42 is added. Preferably, the capacitor 42 has a capacitance value in a range of 1 μF to 20 μF. As the electronic ballast has a high frequency, the capacitor 42 does not need a very high capacitance value.

The voltage-controlled transistors in the foregoing embodiments may be metal-oxide-semiconductor field-effect transistor (MOSFET) or bipolar junction transistor (BJT).

In sum, the second embodiment is substantially the same as the first embodiment. Both embodiments can employ the load-varying circuit 23, 23' to simulate the lamp filament inside a conventional lamp and the LED light string 40 to generate a resistance between the electrodes L1, L2 and between the electrodes N1, N2. Accordingly, a short-circuit current generated between the electrodes L1, L2 and between the electrodes N1, N2 of the LED lamp can be avoided damaging the electronic ballast 10 and the LED lamp, and a rectification effect can also be provided.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An LED lamp compatible with an electronic ballast generating preheating current, the LED lamp comprising:
   a first electrode terminal and a second electrode terminal on both ends of the LED lamp, each of the first electrode terminal and the second electrode terminal having two electrodes;
   two preheating current control units respectively connected to the first electrode terminal and the second electrode terminal, each preheating current control unit having:
      a ballast-side rectification circuit having:
         two AC input terminals respectively connected to the electrodes of the first electrode terminal or the second electrode terminal;
         two DC output terminals; and
         multiple rectification diodes, each rectification diode having a recovery time less than 2.5 microsecond; and
      a load-varying circuit having:
         a resistive load; and
         a control circuit connected in series with the resistive load between the DC output terminals of the ballast-side rectification circuit, and adjusting a resistance of the resistive load;
   two lamp-side rectification circuits, each lamp-side rectification circuit having:
      multiple rectification diodes, each rectification diode having a recovery time less than 2.5 microsecond;

two input terminals respectively connected to one of the electrodes of the first electrode terminal and one of the electrodes of the second electrode terminal; and two output terminals; and at least one LED light string, each one of the at least one LED light string having two ends respectively connected to the two output terminals of each lamp-side rectification circuit, and each one of the at least one LED light string formed by multiple series-connected LED elements.

2. The LED lamp as claimed in claim 1, wherein
the resistive load is a resistor;
the control circuit of the load-varying circuit has:
a voltage-controlled transistor connected in series with the resistor between the two DC output terminals of the ballast-side rectification circuit; and
a controller connected to a control terminal of the voltage-controlled transistor to output a driving voltage to the control terminal, the controller built in with a resistance-switching mode, and outputting the driving voltage when the ballast-side rectification circuit outputs DC power, and lowering and outputting the driving voltage when the ballast-side rectification circuit outputs no DC power during the resistance-switching mode.

3. The LED lamp as claimed in claim 2, wherein the controller presets a switching time, and starts counting time when driving the voltage-controlled transistor to turn on, and lowers the driving voltage when the switching time expires.

4. The LED lamp as claimed in claim 3, wherein the recovery time of each rectification diode of the ballast-side rectification circuit and the lamp-side rectification circuit is below 1 microsecond or equal to 0.2 microsecond or less.

5. The LED lamp as claimed in claim 4, wherein a capacitor is parallelly connected to the two ends of each one of the at least one LED light string.

6. The LED lamp as claimed in claim 3, wherein a capacitor is parallelly connected to the two ends of each one of the at least one LED light string.

7. The LED lamp as claimed in claim 3, wherein the voltage-controlled transistor is a metal-oxide-semiconductor field-effect transistor (MOSFET) or a bipolar junction transistor (BJT).

8. The LED lamp as claimed in claim 2, wherein the recovery time of each rectification diode of the ballast-side rectification circuit and the lamp-side rectification circuit is below 1 microsecond or equal to 0.2 microsecond or less.

9. The LED lamp as claimed in claim 8, wherein a capacitor is parallelly connected to the two ends of each one of the at least one LED light string.

10. The LED lamp as claimed in claim 2, wherein a capacitor is parallelly connected to the two ends of each one of the at least one LED light string.

11. The LED lamp as claimed in claim 2, wherein the voltage-controlled transistor is a metal-oxide-semiconductor field-effect transistor (MOSFET) or a bipolar junction transistor (BJT).

12. The LED lamp as claimed in claim 1, wherein
the resistive load has a first resistor and a second resistor, wherein a resistance value of the first resistor is less than a resistance value of the second resistor; and
the control circuit has:
two voltage-controlled transistors, wherein one of the voltage-controlled transistors is connected in series with the first resistor, and the other voltage-controlled transistor is connected in series with the second resistor, the voltage-controlled transistor and the first resistor that are series-connected and the other voltage-controlled transistor and the second resistor that are series-connected are parallelly connected between the two DC output terminals of the ballast-side rectification circuit; and a controller having two output terminals respectively connected to two control terminals of the two voltage-controlled transistors to output a driving voltage to the control terminals, the controller built in with a resistance-switching mode, and outputting the driving voltage to turn on the voltage-controlled transistor connected with the first resistor when the ballast-side rectification circuit outputs DC power, and outputting the driving voltage to turn on the voltage-controlled transistor connected with the second resistor when the ballast-side rectification circuit outputs no DC power during the resistance-switching mode.

13. The LED lamp as claimed in claim 12, wherein the controller presets a switching time, starts counting time when driving the voltage-controlled transistor series-connected with the first resistor to turn on, and stops outputting the driving voltage to the voltage-controlled transistor series-connected with the first resistor while outputting the driving voltage to the voltage-controlled transistor connected with the second resistor when the switching time expires.

14. The LED lamp as claimed in claim 13, wherein the recovery time of each rectification diode of the ballast-side rectification circuit and the lamp-side rectification circuit is below 1 microsecond or equal to 0.2 microsecond or less.

15. The LED lamp as claimed in claim 14, wherein a capacitor is parallelly connected to the two ends of each one of the at least one LED light string.

16. The LED lamp as claimed in claim 13, wherein a capacitor is parallelly connected to the two ends of each one of the at least one LED light string.

17. The LED lamp as claimed in claim 13, wherein each voltage-controlled transistor is a metal-oxide-semiconductor field-effect transistor (MOSFET) or a bipolar junction transistor (BJT).

18. The LED lamp as claimed in claim 12, wherein the recovery time of each rectification diode of the ballast-side rectification circuit and the lamp-side rectification circuit is below 1 microsecond or equal to 0.2 microsecond or less.

19. The LED lamp as claimed in claim 18, wherein a capacitor is parallelly connected to the two ends of each one of the at least one LED light string.

20. The LED lamp as claimed in claim 12, wherein a capacitor is parallelly connected to the two ends of each one of the at least one LED light string.

21. The LED lamp as claimed in claim 12, wherein each voltage-controlled transistor is a metal-oxide-semiconductor field-effect transistor (MOSFET) or a bipolar junction transistor (BJT).

22. The LED lamp as claimed in claim 1, wherein the recovery time of each rectification diode of the ballast-side rectification circuit and the lamp-side rectification circuit is below 1 microsecond or equal to 0.2 microsecond or less.

23. The LED lamp as claimed in claim 22, wherein a capacitor is parallelly connected to the two ends of each one of the at least one LED light string.

24. The LED lamp as claimed in claim 1, wherein a capacitor is parallelly connected to the two ends of each one of the at least one LED light string.

* * * * *